United States Patent [19]
Belcher

[11] 4,223,752
[45] Sep. 23, 1980

[54] SCALE EMPLOYING WHEATSTONE-TYPE BRIDGES AND STRAIN GAGES

[76] Inventor: Claude A. Belcher, 4456 Arch St., San Diego, Calif. 92116

[21] Appl. No.: 8,401

[22] Filed: Feb. 1, 1979

[51] Int. Cl.³ .................... G01G 3/14; G01G 21/24
[52] U.S. Cl. .................................... 177/211; 177/255
[58] Field of Search ............................... 177/211, 255

[56] References Cited

U.S. PATENT DOCUMENTS

| | | | |
|---|---|---|---|
| 3,439,761 | 4/1969 | Laimins | 177/211 |
| 3,512,595 | 5/1970 | Laimins | 177/211 X |
| 3,707,076 | 12/1972 | Jones | 177/211 X |
| 4,050,532 | 9/1977 | Provi et al. | 177/211 |
| 4,082,154 | 4/1978 | Pillote | 177/211 |
| 4,125,168 | 11/1978 | Ormond | 177/211 |
| 4,150,729 | 4/1979 | Ormond | 177/211 |

*Primary Examiner*—George H. Miller, Jr.
*Attorney, Agent, or Firm*—Duane C. Bowen

[57] ABSTRACT

A scale including a rectangular base frame supporting on opposite sides horizontally disposed torsion bars having their central portions secured to said frame and including a horizontal, plate-like rectangular platform superposed to said frame and bars. End portion of said bars support said platform by upstanding, threaded members engaged in said bars, eccentric seats on threaded member heads, and balls on said seats on which the platform rests. General platform leveling can be achieved by full-turn rotation of the threaded members and scale calibration adjustment can be facilitated by less than full-turn adjustment of said threaded members thereby shifting the locations of the balls along the torsion bars. Each torsion bar end portion has an upper and a lower strain gage for a total of eight. Two modified Wheatstone bridges use the strain gages for all resistors of the bridges whereby all bridge resistors are active and the two bridges form the sole electrical means to measure load on the scale.

8 Claims, 7 Drawing Figures

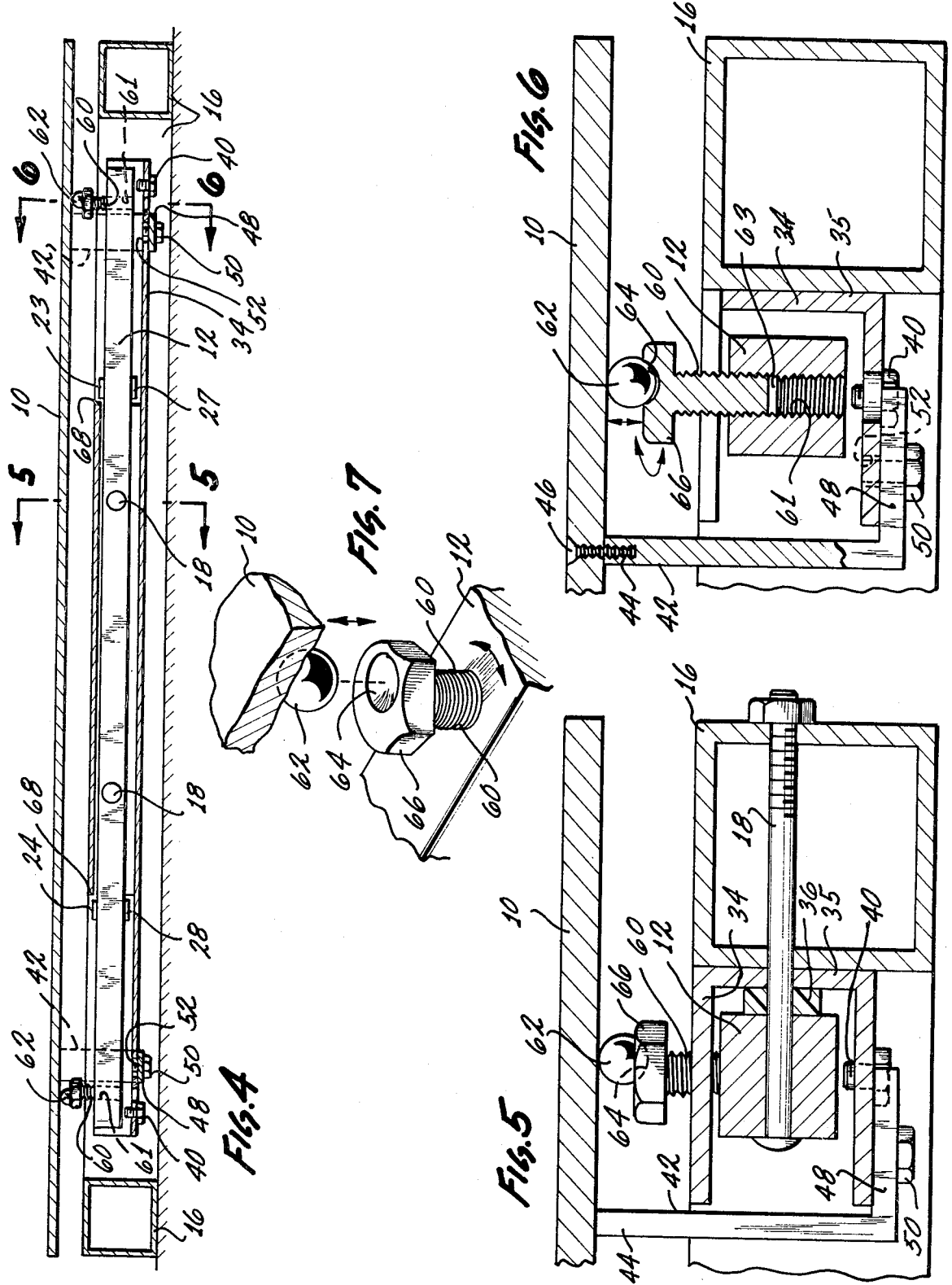

4,223,752

SCALE EMPLOYING WHEATSTONE-TYPE BRIDGES AND STRAIN GAGES

BRIEF SUMMARY OF THE INVENTION

Background and Objectives

My invention concerns scales employing modified Wheatstone bridges having strain gages, mounted on torsion bars, as the resistors of those bridges.

Scales using strain gages that I have observed have used Wheatstone bridges in structures differing from my structure. Each such prior construction has used twice as many strain gages as I use whereby I have a more economical construction, which is one of my objectives.

Scales using strain gages I have observed have had excessive heights because strain gages were applied to vertically oriented, convoluted tension members and it is an objective of my invention to provide minimum scale height and, more specifically, to provide such minimum scale height by use of horizontally oriented torsion bars to which loads are applied in bending moments. One gage is applied to the upper surface of the torsion bar end portion and another strain gage is applied to the lower surface of the torsion bar end portion. It is an objective of my invention to use such torsion bars with ends unsupported.

In calibrating scales, it is a further objective of my invention to provide for application of loads at finely adjustable points relative to the torsion bar and, more specifically, to provide such adjustment of points of applications of loads by balls eccentrically supported by seats on rotatable mounts.

A preliminary examination search was conducted before filing application for patent and the searcher located the following identified patents:

| | | |
|---|---|---|
| 3,477,532 | 3,927,560 | 3,949,603 |
| 3,512,595 | 3,879,998 | 3,837,222 |
| 3,398,603 | 3,854,540 | 3,734,216 |
| 4,061,198 | 3,831,687 | 3,554,025 |
| 3,968,683 | | |

I was not aware of the specific devices shown by these patents before the search, and I do not believe they show the invention described in the present patent application.

My invention will be best understood, together with additional objectives and advantages thereof, from the following description, read with reference to the drawings, in which:

THE DRAWINGS

FIG. 4 is an enlarged view, primarily in section, taken on line 4—4 of FIG. 1.

FIG. 5 is an enlarged view, primarily in section, taken on line 5—5 of FIG. 4.

FIG. 6 is a view, primarily in section, taken on line 6—6 of FIG. 4.

FIG. 7 is an enlarged, fragmentary perspective view, in exploded form, illustrating the eccentric supports for balls that are interposed between the scale platform and the scale torsion bars.

SPECIFIC DESCRIPTION

Figure 1:
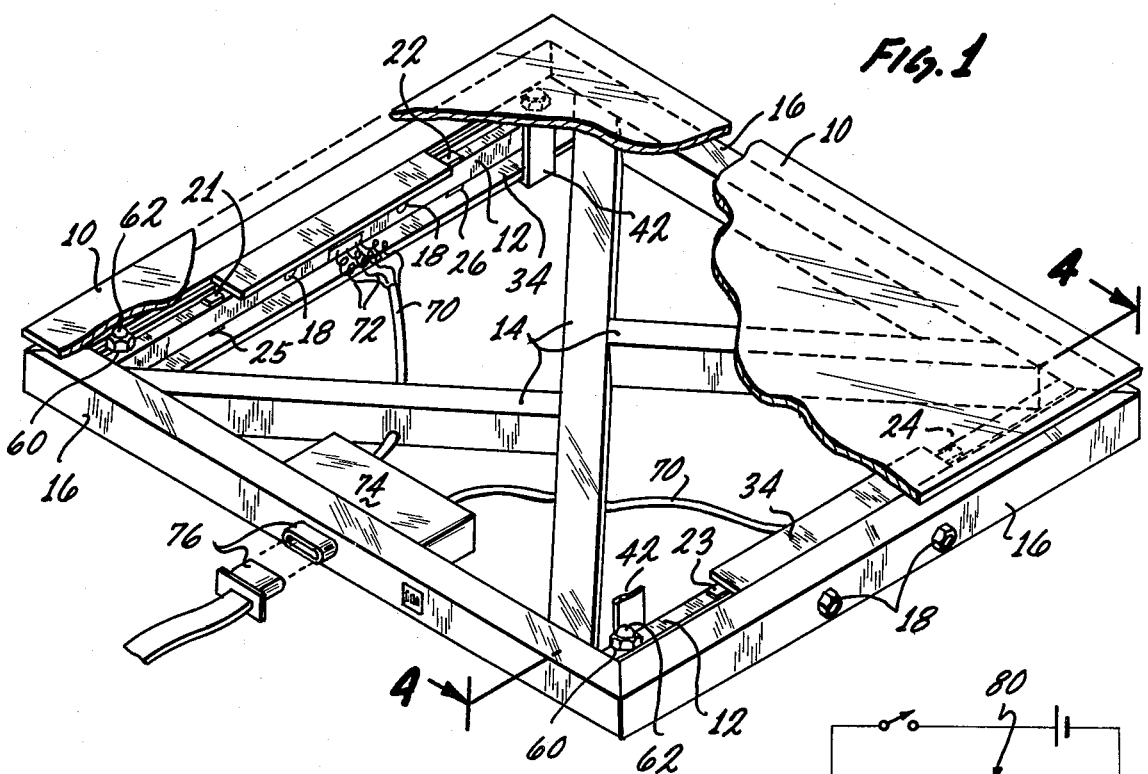
FIG. 1 is a perspective view of a specific embodiment of my invention. The scale platform is partly broken away to reveal other structure.

Principal parts of my new scale include: a flat metal plate forming a platform 10; two parallel, juxtaposed, horizontal torsion bars 12 under opposite ends of said plate 10; and a base 16 (formed by a frame made from square tubing with bracing 14) supporting torsion bars 12 by being secured to the central portion of bars 12 by bolts 18.

Eight strain gages 21, 22, 23, 24, 25, 26, 27, 28 are appropriately secured or bonded on upper and lower surfaces of the end portions of torsion bars 12, i.e., about ⅓ way from each end of bars 12 in one configuration. Each bar end portion has an upper and a lower strain gage, i.e., 21-25, 22-26, 23-27, 24-28. The upper strain gages 21, 22, 23, 24 are subject to tension as the end portions of bars 12 bend downwardly under load and the lower strain gages 25, 26, 27, 28 are subject to compression. Strain gages 21, 22, 25, 26 form four active resistances in a modified Wheatstone bridge 30, and strain gages 23, 24, 27, 28 form four active strain gages in a second modified Wheatstone bridges 32.

As before indicated, in the prior art familiar to me up to sixteen strain gages and four Wheatstone bridges were used in comparable installations. The four scale members subjected to tension and compression in that prior art (which each was a convoluted, vertically oriented member) each had a complete Wheatstone bridge associated with it and in each Wheatstone bridge associated with each such scale member had two strain gages subjected to tension alongside each other, and had two strain gages subjected to compression alongside each other, so that it could be said that, in some applications, in each Wheatstone bridge two resistors (strain gages) measured tension in the same area and two resistors (strain gages) measured compression in the same area, in such prior installations. Strain gages in tension increase resistance resulting in increased signal, and strain gages in compression decrease resistance resulting in decreased signal. I have discovered that eight strain gages 21-28 and two modified Wheatstone bridges 30, 32 are sufficient, thereby cutting the expense of these elements in half.

Before continuing on as to the basic functioning parts of my scale, I will deal with some of the structure associated with torsion bars 12. The use of channels 34 housing bars 12 is illustrated. The channel bases 35 abut the square tubing of frame 16 and bolts 18 extend through channel bases 35 as well as through bars 12 and tubing 16. Shims or preferably washers 36 around bolts 18 are needed to space bars 12 from the bases 35 of channels 34 to prevent interference or drag of torsion bars 12 on bases 35 of channels 34 as they are biased downwardly under load applied to platform 10 of the scale.

To avoid damaging bars 12 by bending them beyond their elastic limits by overloading or by subjecting them to momentary excessive loading, screws 40 are disposed in threaded openings in the lower legs of channels 34 and provide adjustable abutments to the lower end surfaces of bars 12.

Platform 10 applies force to torsion bars 12 under load in the process of weighing so platform 10 cannot be fixed to bars 12 or base 16. However, platform 10 should be generally restrained from shifting horizontally relative to bars 12 and base 16. The means to provide such general restraint illustrated in the drawings are L-shaped members 42 having the upper ends of their vertical legs 44 secured in abutment to the underside of platform 10 by screws 46. The horizontal legs 48 of L-shaped members 42 have screws 50 upstanding therefrom and loosely fitting in larger openings 52 in channels 34, whereby platform 10 has general restraint against displacement from base 16.

Interposed between platform 10 and torsion bars 12 are bolts 60 threaded in threaded openings 61 extending through the ends of bars 12. Metal balls 62 are disposed in seats 64 in the heads 66 of bolts 60. Seats 64 are eccentric regarding the longitudinal axis of rotation of bolts 60. The lower ends of bolts 60 have slots 63 so that the bolts could be rotatably adjusted by fitting a screw driver blade in slots 63 (lower legs of channels 34 having access openings to the lower ends of threaded openings 61 for screw driver blade access to bolt slots 63). Rotation less than a full rotation (or, really, less than 180°) of bolts 60 achieves fine adjustments of the points of application of the platform load on torsion bars 12 and aids in equalizing (zero balancing) the electrical output. Such location, of the point of loading, of course, is the point contacts of balls 62 with the under surface of platform 10. Full or half rotations of bolts 60 also could be used to level platform 10. The ends of the upper legs of channels 34 are cut off at 68 to avoid interfering with bolts 60 and balls 62.

It will be understood by those skilled in the art that adjustments of the points of contact of balls 62, with platform 10, along the lengths of torsion bars 12, are equivalent to find adjustments of the values (output sensitivity) of the resistors 21–28, i.e., as the balls 62 are moved toward the ends of bars 12, the output signal of strain gages 21–28 read larger (are increased) under equal load on platform 10. As the balls are moved towards the center portion of bars 12, the output signal of the strain gages read lower. In other words, by mechanical means I am able to achieve the equivalent of find adjustments to the resistance values of gages 21–28.

In FIG. 1, I have shown some wiring details of an actual configuration of electrical circuitry for the scale including conduits 70 to the two modified Wheatstone bridges with the electrical leads 72 connecting to the four strain gages bonded to each torsion bar 12, the terminal board housing 74, and the external electrical connection 76 to the scale. Such circuitry details, however, can take a number of configurations depending on choice and also the size of scale involved, so I thought the disclosure would be more meaningful to those skilled in the art if the fundamentals of applicable circuitry displayed in FIG. 3 were discussed rather than routine details that would tend to obscure rather than illuminate the actual invention.

Figure 3:
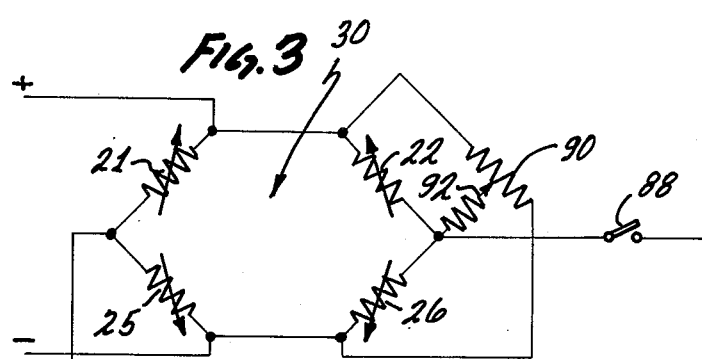
FIG. 3 is a diagram of the basic circuitry of the present invention.

Note from FIGS. 1, 3 and 4 that all eight strain gages 21–28 are active in measuring strain each at a different location on torsion bars 12. No gage duplicates measurement at the same place. This is to be contrasted with the prior systems I am familiar with, represented in FIG. 2, in which a Wheatstone bridge 80 was associated with the equivalent of each end of torsion bars 12.

As before indicated, such equivalent was a vertically convoluted torsion member, rather than the horizontal torsion bars 12 I use, as depicted, whereby I am able to achieve the very minimum of vertical height to my scale, much less than I have found in the art before my invention. More specifically, my scale height, as shown, represents little more than the thickness of platform 10 and the vertical thickness of torsion bars 12 plus the nominal height required for the flexing of bars 12 and avoidance of interference, and whatever instrumentality is used to transfer load from platform 10 to bars 12 (such instrumentality being balls 62 and bolts 60 in the drawings). Having such minimum height scale will be advantageous in various installations and perhaps especially in portable scales. Suppose, for example, the scale were to be used to weigh a wheel of a truck, in which case there would be minimum height for the truck wheel to mount in going from the supporting surface such as a pavement to platform 10.

Figure 2:
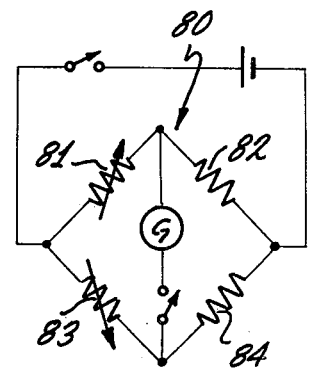
FIG. 2 is an electrical diagram used to discuss the prior art.

To continue with the discussion of the prior art represented by FIG. 2, if a bridge 80 is used for the equivalent of each end of torsion bar 12 in the prior art, then strain gages 81 and 82 would measure tension, and strain gages 83 and 84 would measure compression. I believe only half as many strain gages are needed.

The modified Wheatstone bridges per se 30, 32 shown in FIG. 3 will be recognized to be generally of traditional configurations. Wheatstone bridges can be electrically powered by a battery or low-voltage source of direct current or can be adapted to a-c measurements. A Wheatstone bridge is adapted to handle the small resistance changes found in strain gages. I have shown a galvanometer 86 for reading of results but actually a more sophisticated instrument would be used, i.e., probably one with digital readout. Readings could be transmitted directly to adding machines, calculators or computers, with or without printers.

Field adjustment or calibration can be accomplished through features incorporated within the electrical system and by means of the eccentrically supported balls 62, etc., previously described, at each of the four corners of the rectangular or square platform 10. Isolation of bridge components for calibration and adjustment is provided for by the four (normally closed) switches 88 that are opened to isolate those components. A precision potentiometer should be used in calibration.

Calibration should be performed by comparing scale indication with certified standard weights. If desired for certain calibration operations, platform 10 could be removed and weights could be hung in the positions of bolts 60.

Switches 88 can be used to isolate bridge 30 and bridge 32 separately and the reading at 86 in each case can be verified to be zero and, if not, adjustment can be made.

The function of variable resistances 90 will be recognized, i.e., sliding contacts 92 can be adjusted therealong, in the manner common to potentiometers. For example, in bridge 32, the balance between resistance 24, 28 can be adjusted relative to resistances 23, 27 depending on the point of contact 92 along resistance 90.

As calibration follows practices known in the art, and obvious to those skilled in the art, no further discussion is needed. Note that my scale can be calibrated in the field.

From the foregoing, those skilled in the art will understand the operation of my new scale and the advantages thereof. Note its portability. In the field of weighing trucks and the like, this means the scale can be used at the location of a truck, rather than the truck having to visit a fixed scale installation. The principles are applicable to scales from small to large loadings, and those skilled in the art will understand variations in configurations depending on type of usage.

The combination of electrical and mechanical features in my invention eliminates such previous state of the art problems as:

1. Distortions of the torsion bar and problems created thereby.
2. Unequal sensitivities of load elements and their associated strain gages. (Only time consuming and difficult means allowed equalization.)
3. Need to transport certified standard weights to the weighing platform.
4. No overload protection provided, with resultant serious damage to the weighting system.
5. Overly expensive and complicated electronic weigh systems lacking ease of repair and adjustment.
6. Distortions and erros introduced by temperature changes, component ageing, twisting of torsion bars, etc.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A scale, comprising:
   (a) a platform and means supporting said platform including load measuring means that includes eight strain gages in which four gages are under tension and four gages are under compression responsive to load applied to said platform,
   (b) two electrical Wheatstone bridges each of the type having four resistors, and said eight strain gages forming said resistors for said bridges whereby all of said resistors are active, said bridges having a joint voltage output signal proportional to said load, said two bridges forming the sole electrical Wheatstone bridge means to measure load of said scale,
   (c) said strain gages being arranged in pairs with one of the pair in tension and one in compression and there being torsion bar means associated with each pair of gages in which a torsion bar end portion is disposed in horizontally cantilevered position, said gages under compression being on one side of said torsion bar end portions and said gages under tension being on the opposite side of said torsion bar end portions, and
   (d) said load measuring means including a load transferring mounting associated with each torsion bar end portion that is adjustable therealong in scale calibration.

2. The subject matter of claim 1 in which each mounting is a ball having a support which is rotatable and has a ball rest eccentric relative to the axis of rotation, whereby adjustment of the load transferring mounting is achieved by rotation of said supports.

3. The subject matter of claim 2 in which each bridge includes a Wheatstone bridge, in which there are two horizontally-disposed, parallel, juxtaposed, spaced torsion bars, in which said platform is generally rectangular, in which said pair of gages have generally four corner locations relative to said platform, in which there is a base secured to the central portion of said torsion bars, and in which said platform rests on said balls.

4. A scale, comprising:
   (a) a plate-like generally rectangular platform,
   (b) a pair of horizontally-disposed, parallel, juxtaposed, spaced torsion bars located under opposite sides of said platform,
   (c) platform supporting means including means operative to apply platform load to the end portions of said torsion bars in four-corner disposition,
   (d) an upper and a lower strain gage on each torsion bar end portion for a total of eight strain gages and two Wheatstone type bridges using said strain gages for all resistors of said bridges whereby all bridge resistors are active and said two bridges form the sole electrical Wheatstone bridge means to measure load of said scale,
   (e) a base secured to the central portions of said torsion bars, and
   (f) said platform supporting means including said torsion bar end portions each having an upstanding, rotatably adjusted, threaded member secured therein with a head having a seat eccentrically located relative to the axis of rotation of said threaded member and a ball located on said ball whereby general leveling of said platform can be achieved by rotary full-turn adjustment of said threaded members and whereby scale calibration adjustment can be facilitated by less than full-turn adjustment of said threaded members thereby shifting the locations of said balls along said torsion bars.

5. The subject matter of claim 4 in which said base includes a rectangular frame and said torsion bars being juxtaposed to opposite sides of said frame, a channel receiving each torsion bar having a base interposed between said frame and the torsion bar, said channels having upper end portions of their legs cut away to avoid interfering with said threaded members and balls, and abutment means between the lower legs of said channels and torsion bar end portions to avoid damage to said torsion bars under excessive loads on said platforms.

6. The subject matter of claim 5 in which there is retainer means depending from said platform and engaging said base preventing lateral shifting of said platform horizontally of said base.

7. A scale, comprising:
   (a) a platform and means supporting said platform including load measuring means that includes strain gages,
   (b) electrical bridge means of the type having four resistors, said strain gages being included in the resistors of said electrical bridge means, said bridge means having a voltage output signal responsive to load,
   (c) said load measuring means including horizontally disposed torsion bars, and said torsion bars having said strain gages mounted thereon to measure strain in said torsion bars, and
   (d) said load measuring means including load transferring mountings associated with said torsion bars that are adjustable therealong in scale calibration.

8. A scale, comprising:
   (a) a plate-like generally rectangular platform,
   (b) a pair of horizontally-disposed, parallel, juxtaposed, spaced torsion bars located under opposite sides of said platform,
   (c) platform supporting means including means operative to apply platform load to the end portions of said torsion bars in four-corner disposition, (d) strain gages on said torsion bar end portions and Wheatstone type bridge means including said strain gages in the resistors of said bridge means,
(e) a base secured to the central portions of said torsion bars, and
(f) said platform supporting means including said torsion bar end portions each having an upstanding, rotatably adjusted, threaded member secured therein with a head having a seat eccentrically located relative to the axis of rotation of said threaded member and a ball located on said seat and a lower surface of said platform bearing on said ball whereby general leveling of said platform can be achieved by rotary full-turn adjustment of said threaded members and whereby scale calibration adjustment can be facilitated by less than full-turn adjustment of said threaded members thereby shifting the locations of said balls along said torsion bars.

* * * * *